United States Patent
Chen et al.

(10) Patent No.: US 11,070,132 B2
(45) Date of Patent: Jul. 20, 2021

(54) SLOPE COMPENSATION METHOD FOR DC-DC CONVERTER

(71) Applicant: Analog Devices International Unlimited Company, Limerick (IE)

(72) Inventors: Hai Chen, Gilbert, AZ (US); Gregory J. Hughes, Paradise Valley, AZ (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/435,039

(22) Filed: Jun. 7, 2019

(65) Prior Publication Data

US 2020/0389091 A1 Dec. 10, 2020

(51) Int. Cl.
*H02M 3/158* (2006.01)
*G05F 1/62* (2006.01)
*H02M 1/00* (2006.01)

(52) U.S. Cl.
CPC .......... *H02M 3/1582* (2013.01); *G05F 1/62* (2013.01); *H02M 2001/0022* (2013.01); *H02M 2001/0025* (2013.01)

(58) Field of Classification Search
CPC ....... H02M 3/1582; H02M 2001/0022; H02M 2001/0025; G05F 1/62
See application file for complete search history.

(56) References Cited

U.S. PATENT DOCUMENTS

| 6,498,466 B1 | 12/2002 | Edwards |
| 7,007,176 B2 | 2/2006 | Goodfellow et al. |
| 7,030,596 B1* | 4/2006 | Salerno ................. H02M 3/158 323/282 |
| 7,518,348 B1* | 4/2009 | Kobayashi ............ H02M 3/156 323/222 |

(Continued)

FOREIGN PATENT DOCUMENTS

CN 107659148 A 2/2018

OTHER PUBLICATIONS

"Digital Peak Current Mode Control With Slope Compensation Using the TMS320F2803x", Texas Instruments Application Note, (2012), 27 pgs.

(Continued)

*Primary Examiner* — Fred E Finch, III
*Assistant Examiner* — Kevin H Sprenger
(74) *Attorney, Agent, or Firm* — Schwegman Lundberg & Woessner, P.A.

(57) ABSTRACT

A voltage regulator circuit comprises a switching circuit, a dynamic clamp circuit, and a comparison circuit. The switching circuit adjusts a switching duty cycle to produce a regulated output voltage using an error signal representative of a difference between a target voltage value and the output voltage. The dynamic clamp circuit determines a maximum peak inductor current command value using the output voltage and an input voltage of the voltage regulator circuit. The comparison circuit sets a maximum peak induc- (Continued)

tor current value using the maximum peak inductor current command value and a slope compensation current, wherein the maximum peak inductor current value is constant for different values of output voltage. The comparison circuit compares a sensed inductor current to a peak inductor current value and enables switching of the voltage regulator system according to the comparison.

14 Claims, 11 Drawing Sheets

(56) References Cited

U.S. PATENT DOCUMENTS

| | | | |
|---|---|---|---|
| 9,467,051 B2 | 10/2016 | Stoichita et al. | |
| 9,899,921 B1 | 2/2018 | Paduvalli | |
| 9,941,795 B1 | 4/2018 | Mayega et al. | |
| 10,180,695 B1* | 1/2019 | Bikulcius | G05F 1/575 |
| 2011/0018507 A1* | 1/2011 | McCloy-Stevens | H02M 3/1588 323/271 |
| 2012/0119718 A1 | 5/2012 | Song | |
| 2012/0153915 A1* | 6/2012 | Loikkanen | G05F 1/618 323/283 |
| 2014/0266110 A1 | 9/2014 | Yuan et al. | |
| 2019/0081546 A1* | 3/2019 | Hsu | H02M 3/158 |
| 2019/0131871 A1* | 5/2019 | Krabbenborg | H02M 1/40 |

OTHER PUBLICATIONS

"LTC3602: 2.5A, 10V, Monolithic Synchronous Step-Down Regulator", Linear Technology Data Sheet, (2008), 20 pgs.

Li, Yang, "Design of A Large Load Peak Current Mode DC-DC Converter", Electronic Sci. and Tech., w/ English Abstract, (Jul. 15, 2016), 4 pgs.

* cited by examiner

SLOPE COMPENSATION METHOD FOR DC-DC CONVERTER

FIELD OF THE DISCLOSURE

This document relates to converter circuits and in particular to slope compensation in direct current to direct current (DC to DC) converter circuits.

BACKGROUND

Converter circuits can be used to generate a regulated output from a circuit input. For example, a buck voltage converter circuit uses an input voltage to generate a regulated output voltage less than the input voltage, and boost converter circuit generates a regulated output voltage greater than the input voltage. One option for regulation of a converter circuit is current-mode control. In current-mode control, switching of energy to an inductor of the converter circuit is controlled by monitoring the inductor current.

SUMMARY OF THE DISCLOSURE

This document relates generally to electronic circuits for current and voltage regulation and more specifically to improvements in current-mode control of voltage converter circuits. In some aspects, a voltage regulator circuit includes a switching circuit, a dynamic clamp circuit, and a comparison circuit. The switching circuit adjusts a switching duty cycle to produce a regulated output voltage using an error signal representative of a difference between a target voltage value and the output voltage. The dynamic clamp circuit determines a maximum peak inductor current command value using the output voltage and an input voltage of the voltage regulator circuit. The comparison circuit sets a maximum peak inductor current value using the maximum peak inductor current command value and a slope compensation current, wherein the maximum peak inductor current value is constant for different values of output voltage; compares a sensed inductor current to a peak inductor current value; and enables switching of the voltage regulator system according to the comparison.

In some aspects, a method of operating a voltage converter circuit includes receiving energy at the voltage regulator circuit and generating an output voltage according to a switching cycle; determining a maximum peak inductor current command value using the output voltage and an input voltage of the voltage regulator circuit; setting a maximum peak inductor current value of the voltage regulator circuit using the maximum peak inductor current command value and a slope compensation current, wherein the maximum peak inductor current value is constant for different values of output voltage; comparing a sensed inductor current to a peak inductor current value, and enabling switching of the voltage regulator circuit according to the comparison.

In some aspects, a voltage regulator circuit includes a switching circuit, a dynamic clamp circuit, and a comparison circuit. The switching circuit adjusts a switching duty cycle to produce a regulated output voltage greater than an input voltage using an error signal representative of a difference between a target voltage value and the output voltage. The dynamic clamp circuit determines a multiplier using an output current and a difference between the input voltage and an output voltage; and modifies a base clamp voltage value using the multiplier to set a maximum peak inductor current command value. The comparison circuit sets a maximum peak inductor current value using the maximum peak inductor current command value and a slope compensation current, wherein the maximum peak inductor current value is constant for different values of output voltage; compares a sensed inductor current to a peak inductor current value; and enables switching of the voltage regulator circuit according to the comparison.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
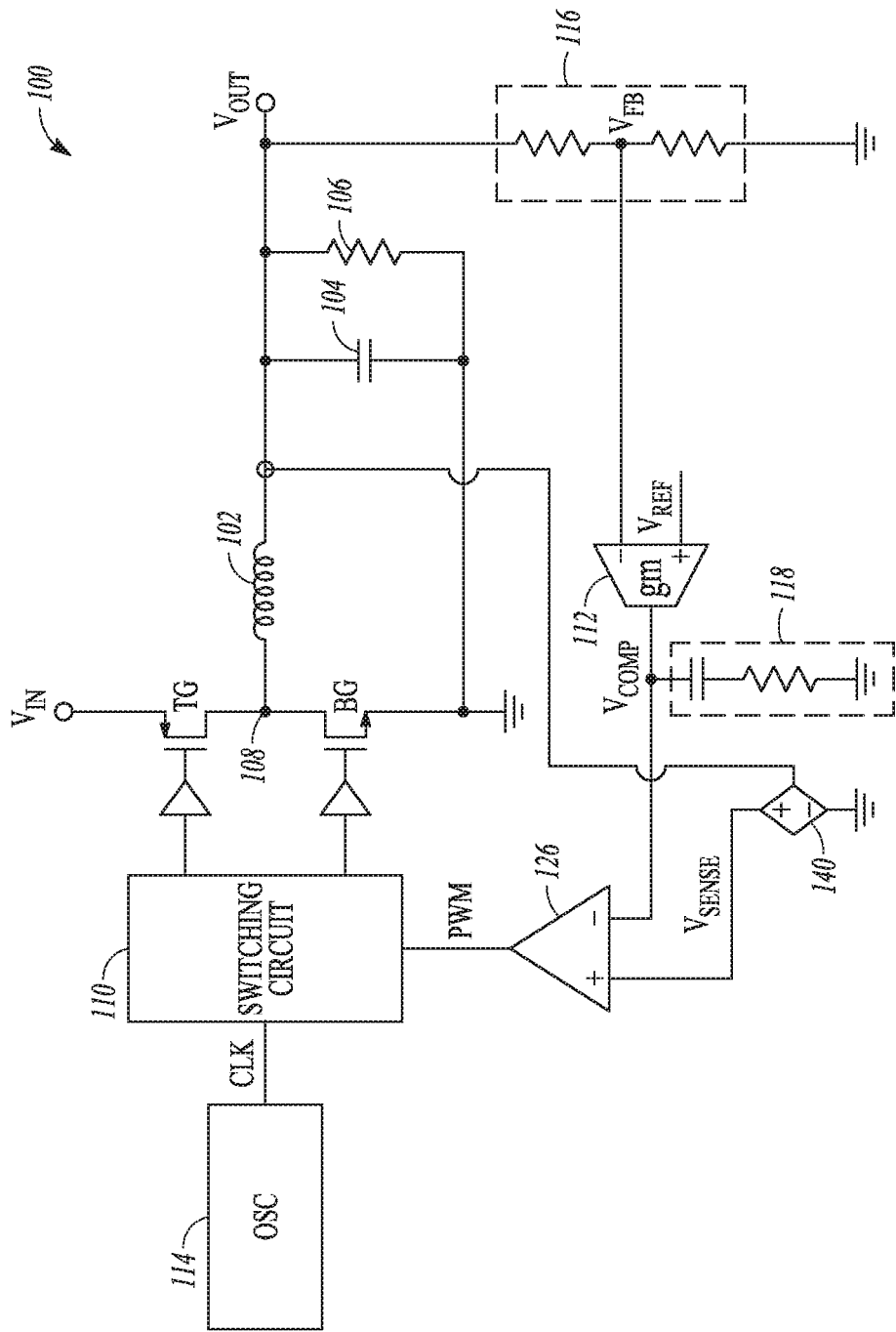
FIG. 1 is a schematic of an example of a voltage regulator circuit.

FIG. 1 is a schematic of an example of a voltage regulator circuit 100. The circuit includes a top-gate transistor (TG), a bottom-gate transistor (BG), and an inductor 102. The circuit can include an output capacitor 104 electrically coupled to an output port and can supply an output voltage $V_{OUT}$ to an output load. The inductor 102 can be coupled between the output capacitor 104 and a circuit node 108. The bottom-gate transistor BG can be electrically coupled between the circuit node 108 and circuit ground, and the top-gate transistor TG can be electrically coupled between the circuit node 108 and an input port that is electrically coupled to an input voltage $V_{IN}$.

The voltage regulator circuit 100 includes a switching circuit 110 or gate driver. The switching circuit 110 receives a clock signal from an oscillator 114 and the switching circuit 110 is configured (e.g., by logic circuitry) to use the clock signal to provide a switching duty cycle that includes a charge portion and a discharge portion. The voltage regulator circuit 100 receives electrical energy during the charge portion of the switching duty cycle.

During the charge portions of successive cycles, TG is turned on or active to raise the voltage of the circuit node 108 almost to the input voltage $V_{IN}$. This initial activation drives a current through the inductor 102 and to the output capacitor 104 and load. During the discharge portion of the switching duty cycles, BG is turned on to pull the circuit node 108 almost to circuit ground. This second activation provides a gradually declining current from the energy stored in the inductor 102 to the output capacitor 104 and load.

The duration of the charge portion of the switching duty cycle can be automatically adjusted to maintain the output voltage $V_{OUT}$ at a specified level. The adjustment can be accomplished using a circuit feedback loop that includes an error amplifier circuit 112. The error amplifier circuit 112 generates an error signal ($V_{COMP}$) representative of a difference between a target voltage value and the voltage $V_{OUT}$ at the output of the voltage regulator circuit 100. The feedback loop can include a resistive divider 116 to provide a scaled representation of the output voltage to the error amplifier circuit 112 instead of the actual output voltage as a feedback voltage. The error amplifier circuit 112 compares the feedback voltage ($V_{FB}$) with a voltage reference ($V_{REF}$) to generate the error signal. The voltage regulator circuit may also include a filter circuit 118 to filter the output of the error amplifier.

The current through the inductor 102 can be sensed (e.g., by a sensing amplifier) and used to generate a sensed current signal ($I_{SNS}$) representative of the inductor current. For current mode control, the output of the error amplifier circuit 112 can be converted to a current output, and the sensed inductor current can be compared to current signal using comparator circuit 126.

The comparator circuit 126 generates a PWM signal provided to the switching circuit 110. The PWM signal can be a digital signal that indicates when the error signal is less than or equal to the reference waveform signal. Alternatively, the digital signal may indicate when the error signal is greater than the reference waveform signal. The switching circuit 110 can include logic circuits to implement PWM switching control. The switching circuit 110 uses the period of the clock signal from the oscillator 114 and the PWM signal from the comparator circuit 126 to set the durations of the charge portion and discharge portion of the switching duty cycle according to the feedback loop. For example, the switching circuit 110 may turn on the top-gate transistor TG for a duration based on the comparison of the error signal and the reference waveform signal and then activate the bottom gate transistor BG for the remainder of each period of the clock signal.

Activation of the TG transistor generates a gradually increasing current in the inductor and activation of the BG transistor generates a gradually decreasing current in the inductor during each switching duty cycle. The increasing and then decreasing current maintains the feedback voltage at a value substantially equal to the reference voltage $V_{REF}$. This activation sequence maintains the output voltage $V_{OUT}$ at the output port at the desired level regardless of the current demand at the load.

In the example shown in FIG. 1, the circuit topology and the target voltage value generate a regulated voltage for $V_{OUT}$ that is less than the voltage at the input $V_{IN}$ of the voltage regulator circuit (e.g., a buck converter circuit). Other examples can include, among other things, voltage regulator circuit topologies to generate a regulated $V_{OUT}$ that is greater than $V_{IN}$ (e.g., a boost converter circuit), circuit topologies to generate a regulated $V_{OUT}$ that can be either greater or less than $V_{IN}$ (e.g., a boost/boost converter circuit), and circuit topologies to generate an inverted value of $V_{IN}$ as the output voltage $V_{OUT}$.

Figure 2:
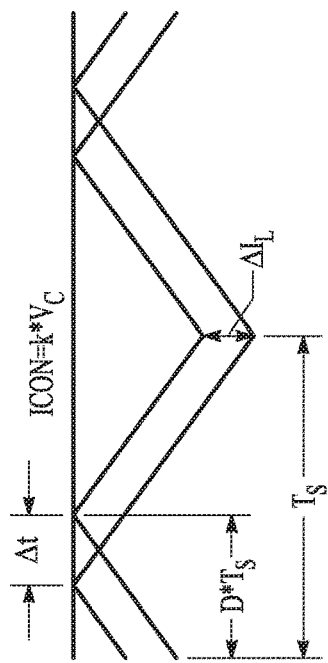
FIG. 2 is an illustration of a waveform of inductor current

An issue with current-mode control is an instability referred to as sub-harmonic oscillation. FIG. 2 is an illustration of a waveform of inductor current $I_L$. The inductor current $I_L$ rises during the charging portion (D) of the switching duty cycle (Ts) to a peak and decreases during the discharging portion of the switching duty cycle (Ts*(1-D)). The sub-harmonic oscillation instability is related to perturbations in the inductor current. Perturbations in inductor current may be caused by, among other things, jitter in the switching of comparator circuit 126 in FIG. 1 A perturbation in the inductor current at the beginning of a switching cycle can cause a shift in the inductor current at the end of the switching cycle. This shifting can lead to poor regulation of the output. If the duration of the charging portion of the switching cycle D is less than one half the switching cycle it can be shown that the shift in inductor current at the end of the switching cycle will decrease and die out after a number of switching cycles but will increase if D is more than one half.

Figure 3A:
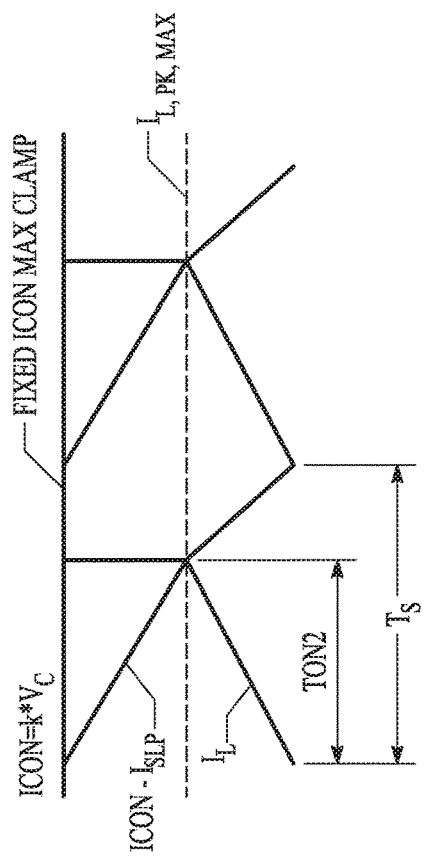
FIGS. 3A and 3B are illustrations of waveforms of inductor current and slope compensation current.

Slope compensation can be used to eliminate sub-harmonic oscillation. Slope compensation uses an inductor current limit that decreases during a switching cycle. FIG. 3A is an illustration of a waveform of inductor current $I_L$ and a decreasing current limit (ICON-$I_{SLP}$). In the example, ICON is an absolute maximum clamping current and $I_{SLP}$ is an increasing slope compensation current. The current limit (ICON-$I_{SLP}$) begins a ICON at $T_S$=0 and decreases with a slope. Energy is received into the voltage regulator and the inductor current $I_L$ increases during the charging portion of the switching cycle $T_S$ (ton=TON1) until it matches (ICON-$I_{SLP}$), at which point the discharge portion of the switching cycle begins. The point at which $I_L$ matches (ICON-$I_{SLP}$) is the peak inductor current $I_{L,PK}$.

Figure 3B:
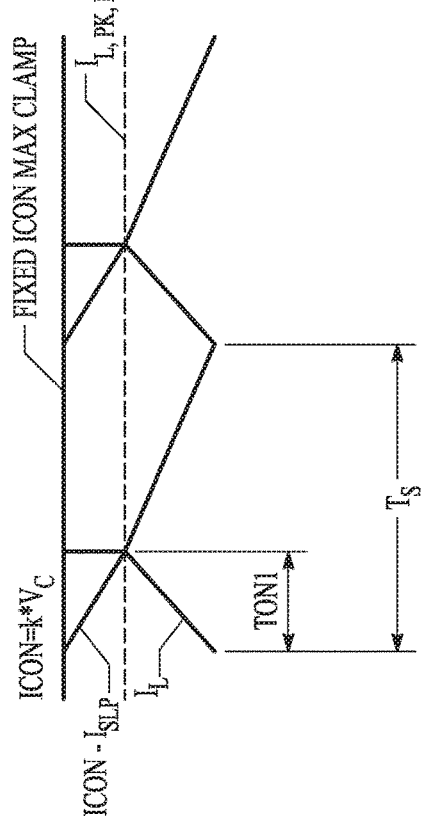

FIG. 3B is an illustration of a waveform of inductor current $I_L$ and decreasing current limit (ICON-$I_{SLP}$), but with a different value of output voltage $V_{OUT}$ and a longer charging time (ton=TON2). The charging time may be increased due to an increase in $V_{OUT}$. The inductor current $I_L$ rises more slowly with a lower slope than in FIG. 3A. The value of decreasing current limit (ICON-$I_{SLP}$) that limits the inductor current is lower than in FIG. 3A. It can be seen from the examples of FIGS. 3A and 3B that a limitation of current control is that the maximum level of peak inductor current $I_{L,PK,MAX}$ is reduced as the switching duty cycle D increases. It is to be noted that the absolute maximum clamping current (ICON) is fixed to the same level of current in both FIG. 3A and FIG. 3B.

An improvement to slope compensation would be to have the maximum level of peak inductor current remain the same as the regulated output voltage level is changed. This would allow a voltage converter circuit to have the same drive capability with different values of output voltage. An approach to accomplish a constant or flat maximum level of peak inductor current $I_L$ for changing VOUT is to use a dynamic maximum clamping current (dynamic ICON) rather than a fixed maximum clamping current (fixed ICON).

Figure 4:
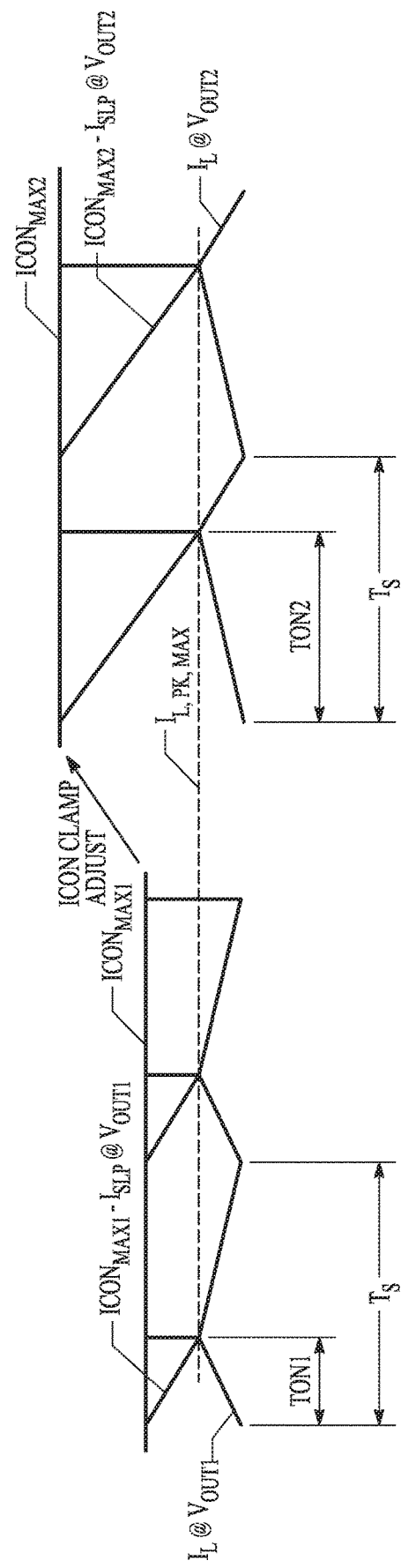
FIG. 4 is a further illustration of waveforms of inductor current and slope compensation current.

FIG. 4 shows an illustration similar to FIG. 3A of a waveform of inductor current $I_L$ and a slope compensation current $I_{SLP}$. The inductor current $I_L$ increases during the charging portion of a switching cycle $T_S$ (ton=TON1) until it matches ($ICON_{MAX1}$-$I_{SLP}$), and the discharge portion of the switching cycle then begins. The limit ($ICON_{MAX1}$-$I_{SLP}$) begins at a maximum inductor current command level ($ICON_{MAX1}$) at $T_S$=0 and decreases until the inductor current $I_L$ matches ($ICON_{MAX1}$-$I_{SLP}$), at which point the slope compensation is reset to the initial current level $ICON_{MAX1}$. In steady state, the inductor current will match ($ICON_{MAX1}$-$I_{SLP}$) at the same current level ($I_{L,PK,MAX}$) for each of the switching cycles.

FIG. 4 also shows an illustrator of a waveform of inductor current $I_L$ and a decreasing current limit, but with a different value of $V_{OUT}$ and a longer charging time (ton=TON2). The difference between the compensation in FIG. 4 from FIG. 3B is that the maximum peak inductor current command level ($ICON_{MAX2}$) changes with the change in $V_{OUT}$. In the example in FIG. 4, $ICON_{MAX1}$ is greater than $ICON_{MAX1}$. The slope of ($ICON_{MAX2}$-$I_{SLP}$) in FIG. 3B is the same as the slope of ($ICON_{MAX1}$-$I_{SLP}$) in FIG. 3A. Because the maximum peak inductor current command level is increased to the $ICON_{MAX2}$ level, the current limit starts from a higher current level and the peak inductor current $I_L$ increases to a higher current level than in FIG. 3B before it matches ($ICON_{MAX2}$-$I_{SLP}$). With the corrected value of $ICON_{MAX2}$ and a dynamic slope for $I_{SLP}$, the maximum peak inductor current level ($I_{L,PK,MAX}$) will be the same for both values of $V_{OUT}$. Tying the maximum peak inductor current command level ($ICON_{MAX}$) to the output voltage can result in the same maximum peak inductor current for different values of $V_{OUT}$, i.e., the maximum peak inductor current level $I_{L,PK,MAX}$ will be flat for all values of the range of $V_{OUT}$.

It should be noted that maximum peak inductor current level $I_{L,PK,MAX}$ is different from the peak inductor current level $I_{L,PK}$. The peak inductor current level $I_{L,PK}$ is determined by the load and the output voltage at the load that the voltage converter will regulate. Only under certain conditions, such as the load at the output requiring a very high peak inductor current, does the peak inductor current level $I_{L,PK}$ reach the level of the maximum peak inductor current level $I_{L,PK,MAX}$. The advantage of the approach in FIG. 4 is that the maximum peak inductor current available remains the same and doesn't decrease as the load at the output changes or the output voltage changes.

Figure 5:
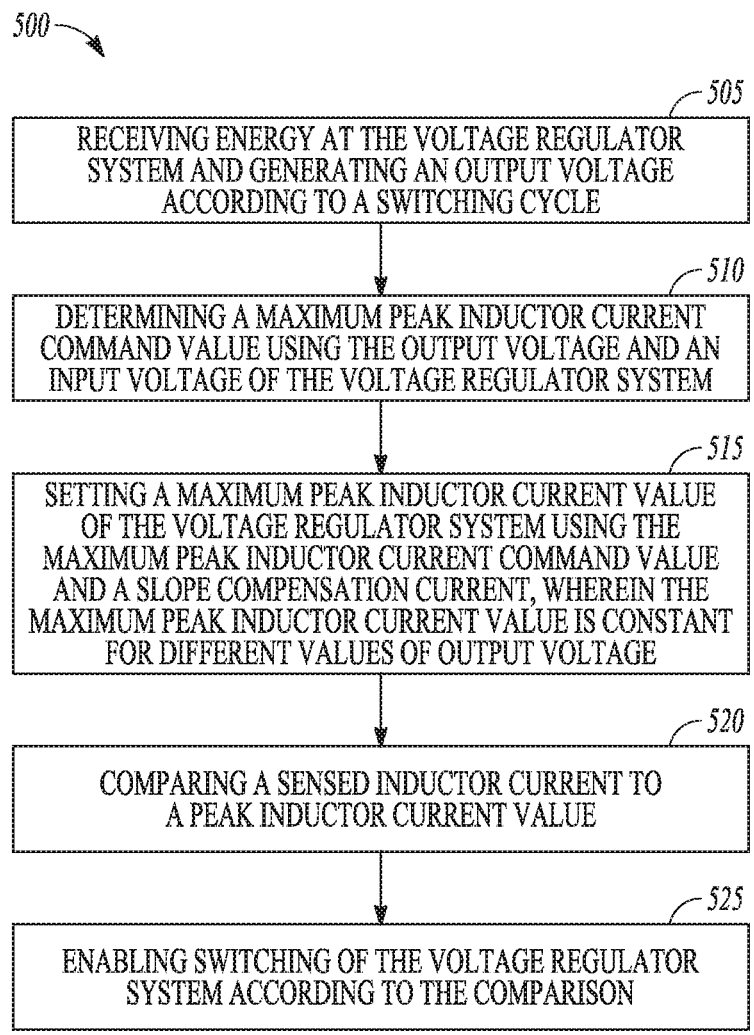
FIG. 5 is a flow diagram of a method of operating a voltage regulator circuit.

FIG. 5 is a flow diagram of a method 500 of operating a voltage regulator circuit. At 505, the voltage regulator circuit receives energy at the voltage regulator system and generates an output voltage according to a switching cycle. The inductor current $I_L$ of the voltage regulator circuit increases during a charging portion of the switching cycle and decreases during a discharge portion of the switching cycle.

At 510, a maximum peak inductor current command value $ICON_{MAX}$ is determined using the input to the voltage regulator circuit and the output voltage generated by the voltage regulator circuit. Because $ICON_{MAX}$ varies with the output voltage, the determined value of $ICON_{MAX}$ is not a fixed value.

At 515, a maximum peak inductor current value ($I_{L,PK,MAX}$) of the voltage regulator circuit is set using the maximum peak inductor current command value $ICON_{MAX}$ and a slope compensation current $I_{SLP}$. As shown in the example of FIG. 4, $I_{SLP}$ can be subtracted from $ICON_{MAX}$ to determine the maximum inductor current level $I_{L,PK,MAX}$, or $$I_{L,PK,MAX} = ICON_{MAX} - I_{SLP}.$$

At 520, the inductor current is sensed and the sensed inductor current $I_{SNS}$ is compared to ($ICON_{MAX}$-$I_{SLP}$). As shown in FIG. 4, the limit ($ICON_{MAX}$-$I_{SLP}$) is decreasing during the charging portion of the switching cycle and $I_{SNS}$ is increasing. The switching of the voltage converter circuit is enabled according to the comparison of $I_{SNS}$ and ($ICON_{MAX}$-$I_{SLP}$) at 525. When the sensed inductor current $I_{SNS}$ matches ($ICON_{MAX}$-$I_{SLP}$), the charging portion of the switching cycle ends, and the discharging portion of the switching cycle begins. Because the maximum peak inductor current command value $ICON_{MAX}$ varies with different values of output voltage ($V_{OUT}$), the value of maximum peak inductor current value $I_{L,PK,MAX}$ when the switching cycle changes from charging to discharging is constant or flat for the different values of output voltage. Thus, a dynamic $ICON_{MAX}$ resolves the issue of reduced maximum peak inductor current discussed regarding FIGS. 3A and 3B, and achieves a Fixed Maximum Output Current Capability for the voltage converter.

Figure 6:
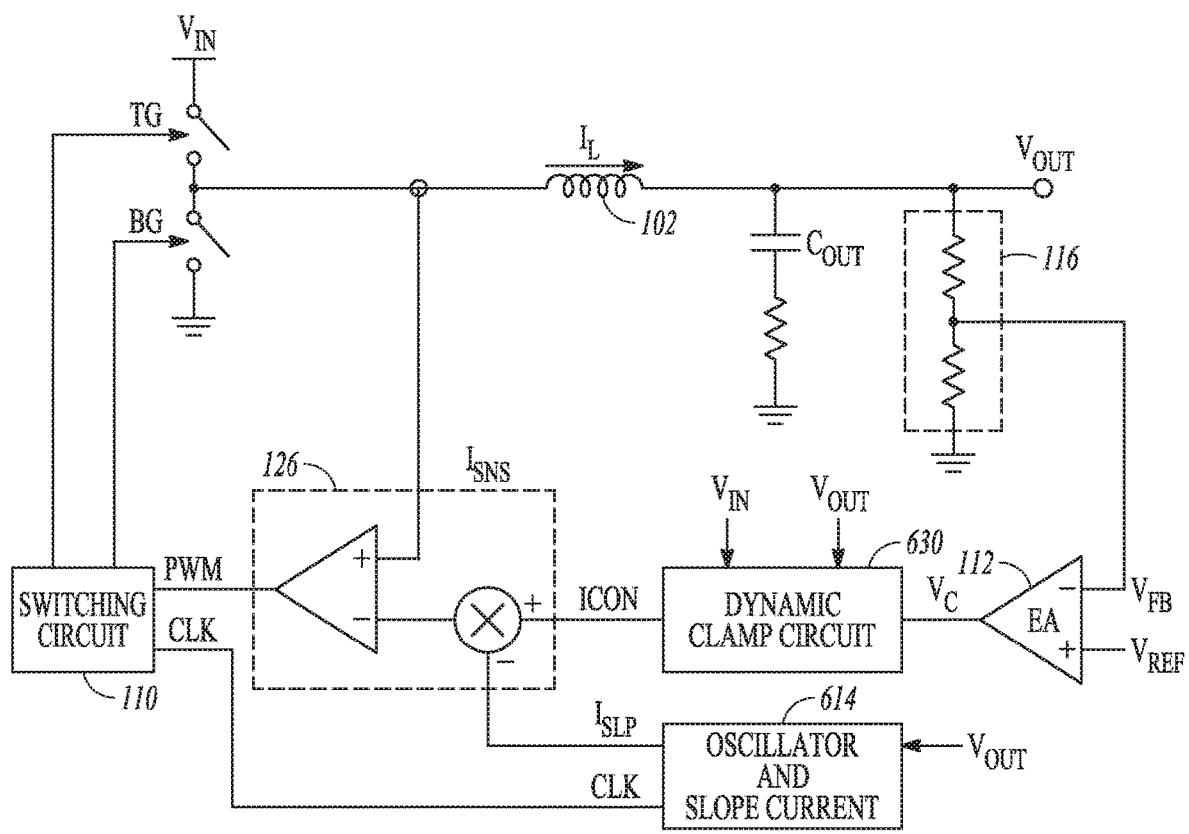
FIG. 6 is a schematic of another example of a voltage regulator circuit.

FIG. 6 is a schematic of another example of a voltage regulator circuit 600. The schematic is similar to the schematic of FIG. 1. The circuit has a buck converter circuit topology and the switching circuit 110 adjusts a switching duty cycle to produce a regulated output voltage less than the input voltage. One difference from the circuit of FIG. 1, is that the voltage regulator circuit 600 of FIG. 6 includes a dynamic clamp circuit 630. The dynamic clamp circuit 630 includes a voltage to current (V/I) converter and produces a dynamic maximum peak inductor current command value $ICON_{MAX}$ or dynamic current clamp. Another difference is the oscillator circuit 614. In the example of FIG. 6, the oscillator circuit 614 generates a slope compensation current $I_{SLP}$ that has a dynamic slope instead of a fixed slope.

Figure 7A:
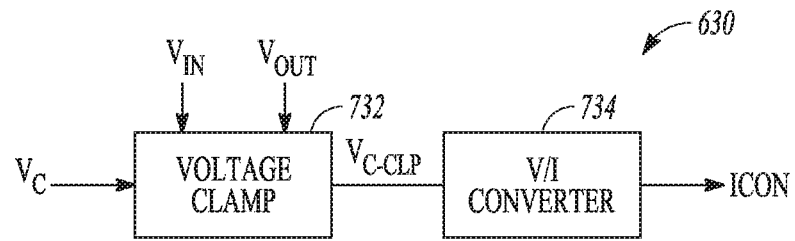
FIG. 7A is a block diagram of portions of an example of a dynamic clamp circuit.

FIG. 7A is a block diagram of portions of an example of the dynamic clamp circuit 630 of FIG. 6. The dynamic clamp circuit 630 includes a voltage clamp circuit 732 and a V/I converter circuit 734. The inputs to the voltage clamp circuit 732 are the compensation voltage $V_C$ from the error amplifier circuit 112, the input voltage $V_{IN}$, and the output voltage $V_{OUT}$ of FIG. 6. The output of the voltage clamp circuit 732 is a clamp voltage $V_{C-CLP}$ which is converted to the maximum peak inductor current command value $ICON_{MAX}$.

Figure 7B:
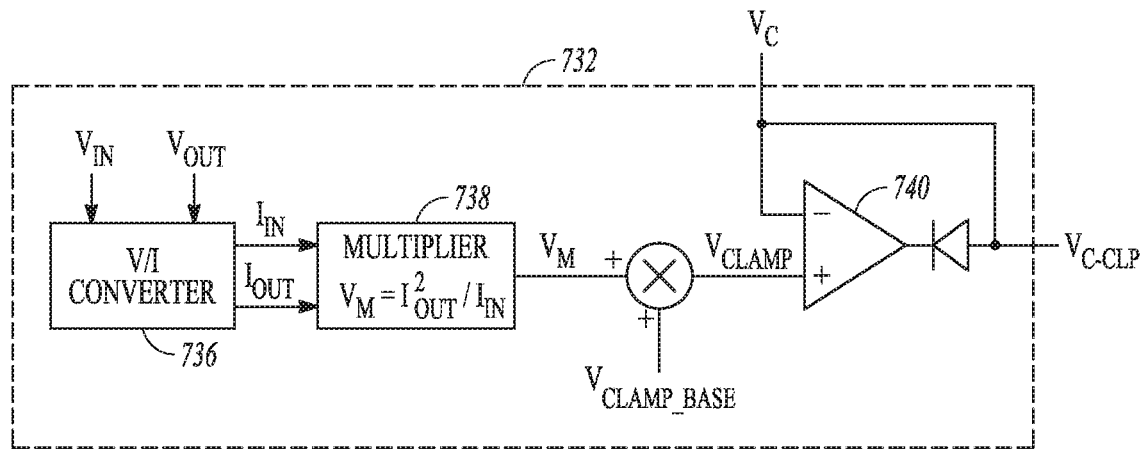
FIG. 7B is a block diagram of portions of an example of a voltage clamp circuit.

FIG. 7B is a circuit diagram of an example of the voltage clamp circuit 732 of FIG. 7A. The voltage clamp circuit 732 modifies a base clamp voltage $V_{CLAMP\_BASE}$ using a multiplier determined using $V_{IN}$ and $V_{OUT}$. $V_{CLAMP\_BASE}$ is determined by the desired $I_{L,PK,MAX}$. The modified base clamp voltage is $V_{CLAMP}$ which is the sum of $V_{CLAMP\_BASE}$ and $V_M$. $V_M$ is the output of the multiplier circuit 738. To generate $V_M$, the input and output voltages $V_{IN}$ and $V_{OUT}$ can be converted to input current and output current $I_{IN}$ and $I_{OUT}$, respectively, using a second V/I converter 736. $V_M$ is the ratio $(I_{OUT})^2/(I_{IN})$. The compensation voltage $V_C$ and $V_{CLAMP}$ are then applied to comparator 740 to generate the dynamic maximum clamp voltage $V_{C-CLP}$. The V/I converter circuit 734 of FIG. 7A then converts the dynamic maximum clamp voltage $V_{C-CLP}$ to the maximum peak inductor current command value $ICON_{MAX}$. The slope compensation current $I_{SLP}$ is subtracted from $ICON_{MAX}$ to implement the improved slope compensation shown in FIG. 4.

Returning to FIG. 6, the oscillator circuit 614 generates a clock signal (CLK) and adjusts the duty cycle to produce the regulated output voltage $V_{OUT}$. The oscillator circuit 614 also generates the slope compensation current $I_{SLP}$ according to the output voltage $V_{OUT}$ and the switching cycle $T_S$. As explained previously herein, $I_{SLP}$ has a slope that is dynamic instead of fixed.

Figure 8:
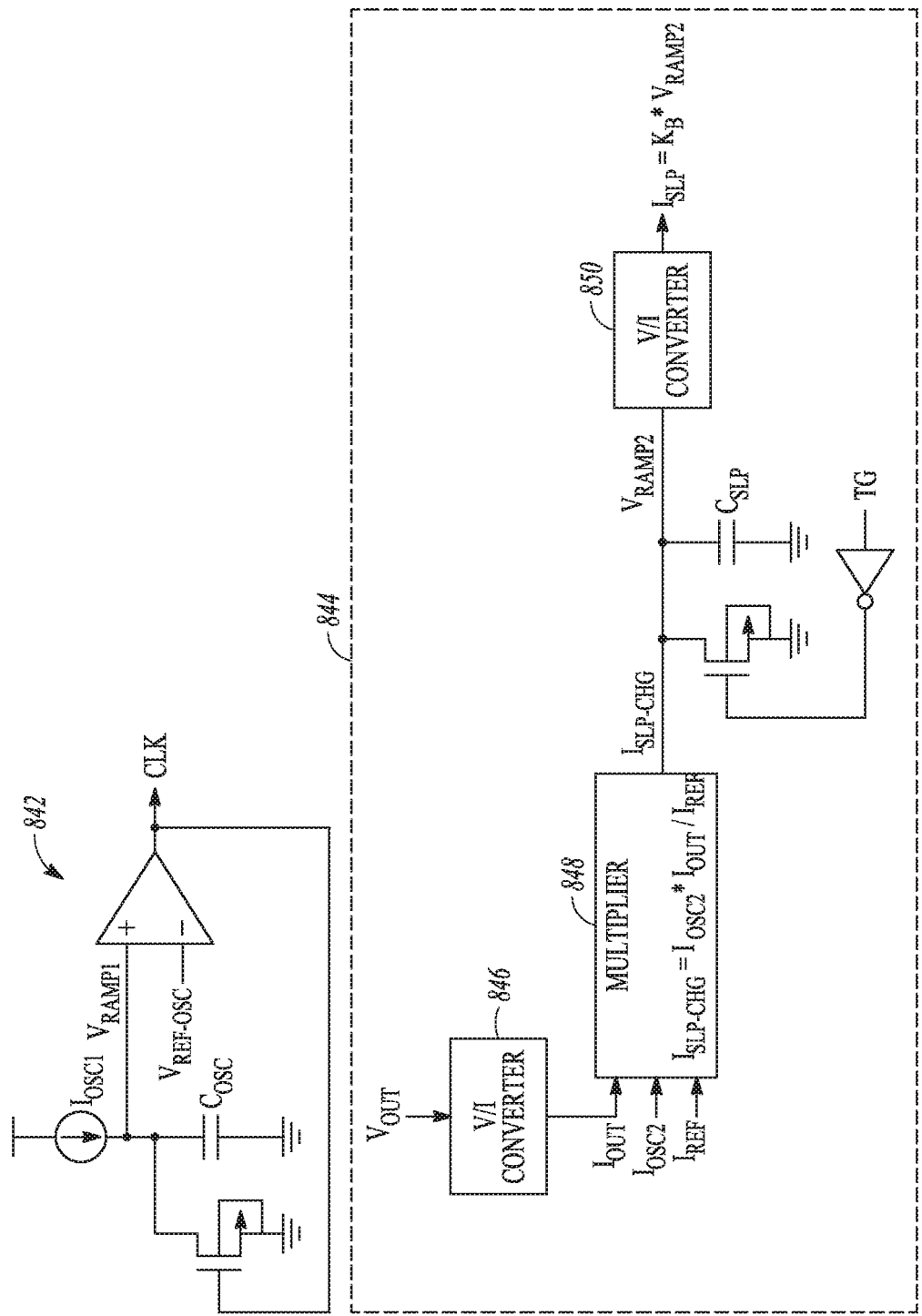
FIG. 8 is a circuit diagram of an example of a clock circuit and a slope current circuit.
Figure 9:
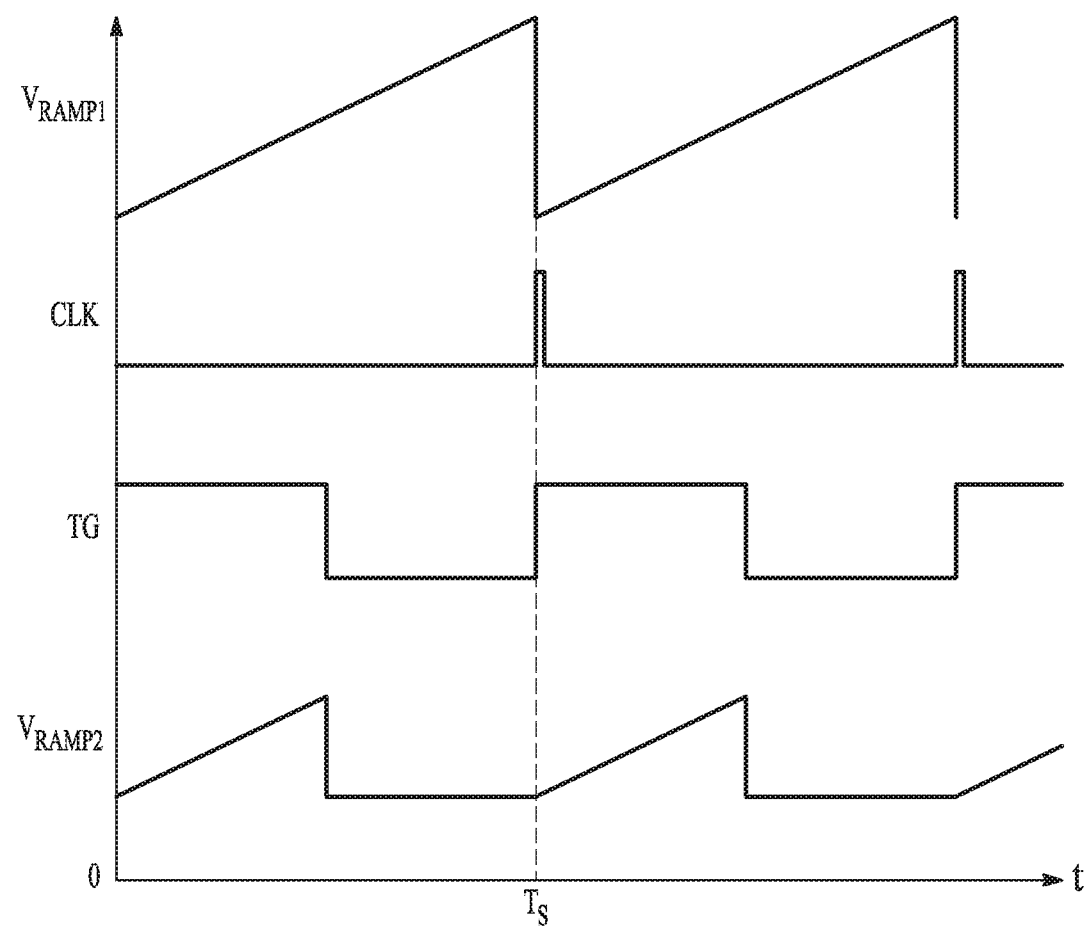
FIG. 9 is an illustration of waveforms of the signals in FIG. 8.

FIG. 8 is a circuit diagram of a clock circuit 842 and a slope current circuit 844. The clock circuit generates a voltage ramp signal $V_{RAMP1}$ by charging a capacitor $C_{OSC}$ with $I_{OSC1}$ and generates the clock signal CLK using $V_{RAMP1}$. FIG. 9 shows waveforms of the signals in the example of FIG. 8 including the $V_{RAMP1}$, CLK, and the charging portion of the switching cycle TG. The switching cycle $T_S$ is determined from the charging of capacitor $C_{OSC}$ and can be determined as $$T_S=(V_{REF\_OSC}*C_{OSC})/I_{OSC1}.$$

The top gate signal TG is determined by the switching circuit 110 in FIG. 1 from CLK and the output of comparator circuit 126.

The slope current circuit 844 includes two V/I converter circuits and a multiplier circuit 848. The first V/I converter 846 converts the output voltage $V_{OUT}$ to an output current $I_{OUT}$. $I_{OUT}$ is used by multiplier circuit 848 to generate a charge current $I_{SLP\_CHG}$ determined as $$I_{SLP\_CHG}=(I_{OSC2}*I_{OUT})/I_{REF},$$

where oscillator current $I_{OSC2}$ and reference current $I_{REF}$ are DC currents to set the desired value of $I_{SLP\_CHG}$. Charge current $I_{SLP\_CHG}$ charges capacitor $C_{SLP}$ to generate a slope compensation voltage ($V_{RAMP2}$) as $$V_{RAMP2}=(I_{SLP\_CHG}/C_{SLP})*t.$$

FIG. 9 shows the waveform of $V_{RAMP2}$. The second V/I converter 850 converts the slope compensation voltage to the slope compensation current $I_{SLP}$.

Figure 10:
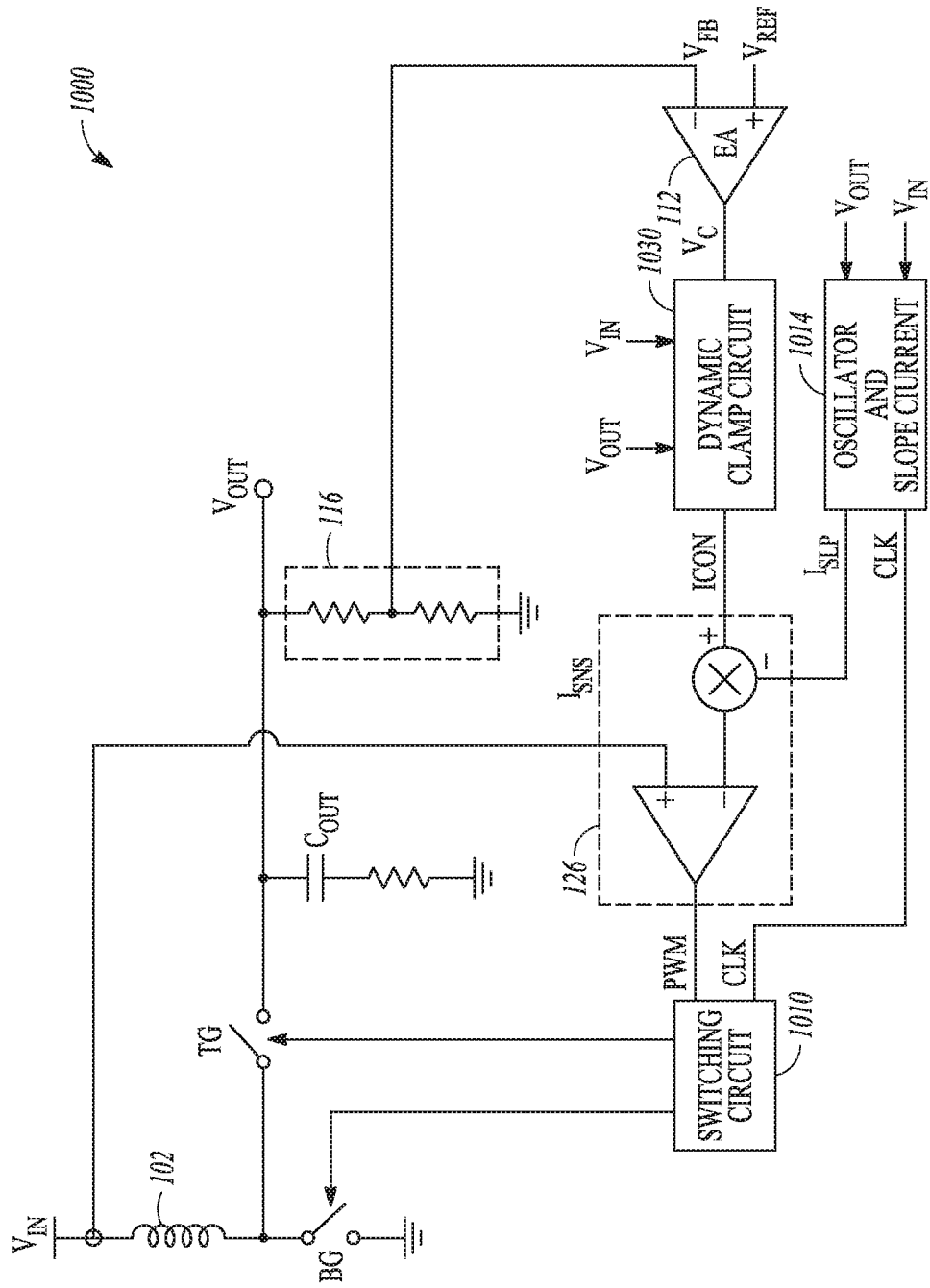
FIG. 10 is a schematic of another example of a voltage regulator circuit.

FIG. 10 is a schematic of another example of a voltage regulator circuit 1000. The circuit has a boost converter circuit topology and the switching circuit 1010 adjusts a switching duty cycle to produce a regulated output voltage greater than the input voltage using an error signal from error amplifier 1012 representative of a difference between a target voltage value and the output voltage. The voltage regulator circuit 1000 includes a dynamic clamp circuit 1030 that produces a dynamic maximum peak inductor current command value $ICON_{MAX}$, and an oscillator circuit 1014 that generates a slope compensation current $I_{SLP}$ that has a dynamic slope.

Figure 11:
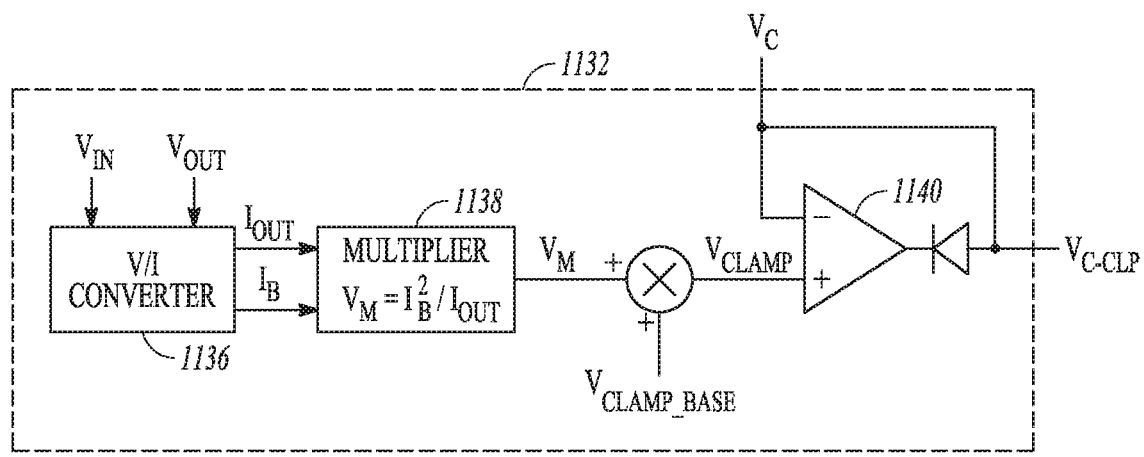
FIG. 11 is a block diagram of portions of another example of a voltage clamp circuit.

The dynamic clamp circuit 1030 is similar to the dynamic clamp circuit 630 of FIG. 6 except that it includes a voltage clamp circuit different from the voltage clamp circuit 732 shown in FIG. 7B. An example of a voltage clamp circuit for a boost converter circuit is shown in FIG. 11. Like the circuit in FIG. 7B, the voltage clamp circuit 1132 of FIG. 11 modifies a base clamp voltage $V_{CLAMP\_BASE}$ using a multiplier. However, in FIG. 11 the output $V_M$ of the multiplier circuit 1138 is determined using an output current $I_{OUT}$ of the voltage regulator circuit and a difference between the input voltage and an output voltage ($V_{OUT}$-$V_{IN}$).

The $V_{CLAMP\_BASE}$ is determined by the desired $I_{L,MAX}$. The modified base clamp voltage is $V_{CLAMP}$ which is the sum of $V_{CLAMP\_BASE}$ and $V_M$. To generate $V_M$, the output voltage $V_{OUT}$ is converted to output current $I_{OUT}$ using V/I converter circuit 1136. The difference between the input voltage and the output voltage ($V_{OUT}$-$V_{IN}$) is converted to a difference current $I_B=k*(V_{OUT}-V_{IN})$, where k is a constant. The output of the multiplier $V_M$ is the ratio $(I_B)^2/(I_{OUT})$.

The compensation voltage $V_C$ and the modified base clamp voltage $V_{CLAMP}$ are then applied to comparator circuit 1140 to generate the dynamic maximum clamp voltage $V_{C\text{-}CLP}$. Another V/I converter circuit (e.g., V/I converter circuit 734 of FIG. 7A) converts the dynamic maximum clamp voltage $V_{C\text{-}CLP}$ to the maximum peak inductor current command value $ICON_{MAX}$. The slope compensation current $I_{SLP}$ is then initialized from $ICON_{MAX}$ to implement the improved slope compensation shown in FIG. 4.

Figure 12:
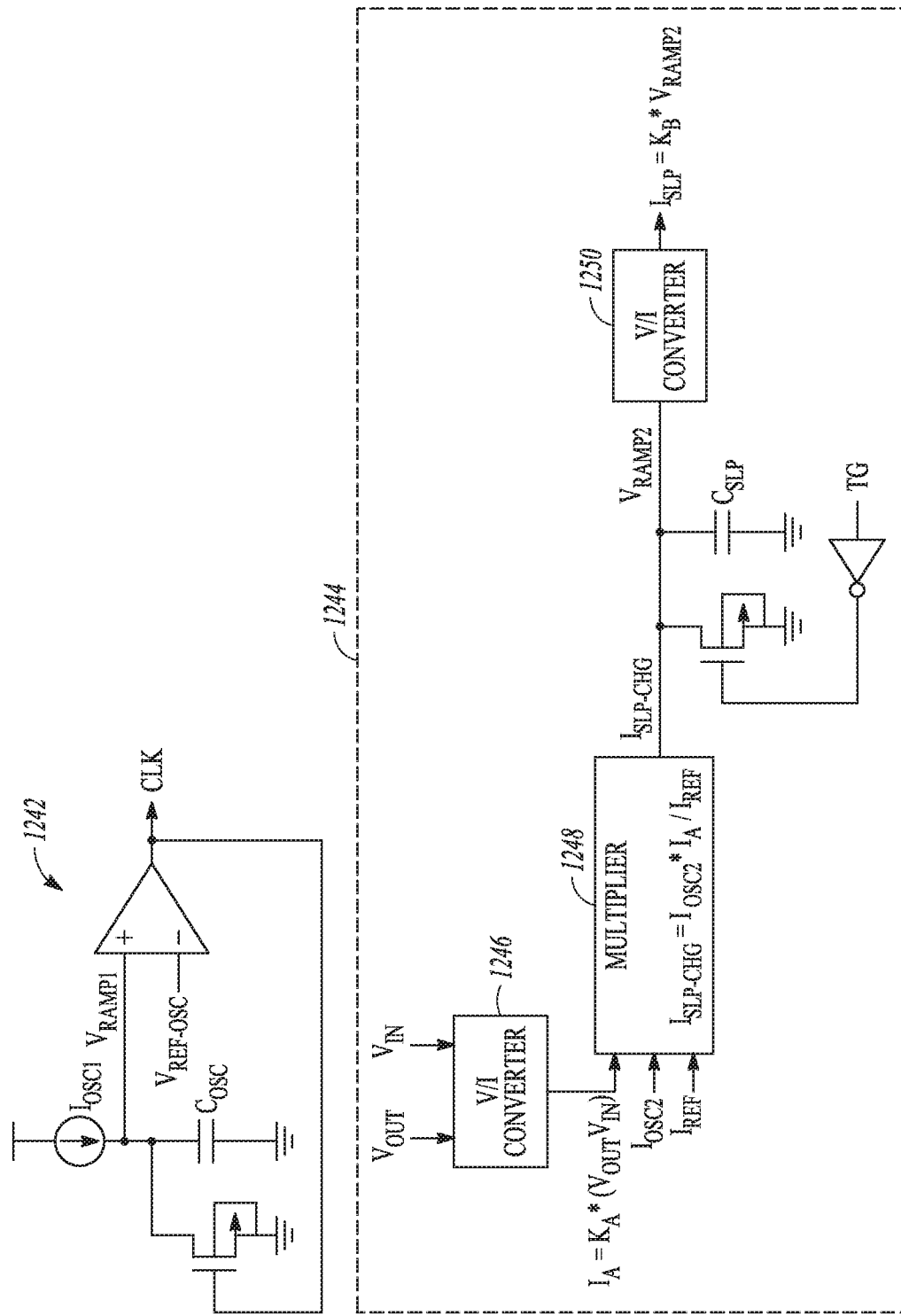
FIG. 12 is a circuit diagram of another example of a clock circuit and a slope current circuit.

Returning to FIG. 10, the oscillator circuit 1014 generates the slope compensation current $I_{SLP}$ according to the output voltage $V_{OUT}$, the input voltage $V_{IN}$, and the switching cycle $T_S$. As with the boost converter circuit example of FIG. 6, $I_{SLP}$ has a slope that is dynamic instead of fixed. FIG. 12 is a circuit diagram of a clock circuit 1242 and a slope current circuit 1244. The clock circuit 1242 is similar to the clock circuit 842 for the boost converter circuit in FIG. 8 and generates a voltage ramp signal $V_{RAMP1}$ by charging a capacitor $C_{OSC}$ with $I_{OSC1}$, and generates the clock signal CLK using $V_{RAMP1}$. The switching cycle $T_S$ is determined from the charging of capacitor $C_{OSC}$ and can be determined as $$T_S=(V_{REF\_OSC}*C_{OSC})/I_{OSC1}.$$

The slope current circuit 1244 in FIG. 12 includes two V/I converter circuits and a multiplier circuit 1248. The first V/I converter circuit 1246 converts the difference between the input voltage and the output voltage ($V_{OUT}$-$V_{IN}$) to a difference current $I_A=k_A*(V_{OUT}-V_{IN})$, where $k_A$ is a constant. The difference current $I_A$ is used by multiplier circuit 1248 to generate the charge current $I_{SLP\_CHG}$ determined as $$I_{SLP\_CHG}=(I_{OSC2}*I_A)/I_{REF},$$

where oscillator current $I_{OSC2}$ and reference current $I_{REF}$ are DC currents to set the desired value of $I_{SLP\_CHG}$. The first V/I converter circuit 1246 converts the output voltage $V_{OUT}$ to an output current $I_{OUT}$. Charge current $I_{SLP\_CHG}$ charges capacitor $C_{SLP}$ to generate a slope compensation voltage ($V_{RAMP2}$) as $$V_{RAMP2}=(I_{SLP\_CHG}/C_{SLP})*t.$$

The second V/I converter 1250 converts the slope compensation voltage to the slope compensation current $I_{SLP}$.

The slope compensation current $I_{SLP}$ is determined by the oscillator circuit 1214. $I_{SLP}$ is then subtracted from the maximum peak inductor current command value $ICON_{MAX}$ determined using the dynamic clamp circuit 1030. The difference ($ICON_{MAX}$-$I_{SLP}$) sets the maximum peak inductor current value $I_{L,PK,MAX}$ to implement the improved slope compensation of FIG. 4. The sensed inductor current $I_{SNS}$ is compared to $I_{L,PK,MAX}$ and the switching of the voltage regulator circuit 1000 is enabled according to the comparison. Again, this regulation with $I_{L,PK,MAX}$ occurs only under conditions in which a very high peak inductor current is needed at the load. Normally, the peak inductor current $I_{L,PK}$ is determined by the feedback to regulate the output voltage to the target voltage.

The method, circuits, and systems described herein enable stable operation of DC-DC converter circuits without subharmonic oscillation in the current limit condition. A dynamic maximum clamp limit and dynamic slope compensation control are combined to achieve a flat inductor current limit over the entire range of output voltage.

Additional Description and Aspects

Aspect 1 includes subject matter (such as a voltage regulator circuit) comprising a switching circuit, a dynamic clamp circuit, and a comparison circuit. The switching circuit adjusts a switching duty cycle to produce a regulated output voltage using an error signal representative of a difference between a target voltage value and the output voltage. The dynamic clamp circuit determines a maximum peak inductor current command value using the output voltage and an input voltage of the voltage regulator circuit. The comparison circuit sets a maximum peak inductor current value using the maximum peak inductor current command value and a slope compensation current, wherein the maximum peak inductor current value is constant for different values of output voltage; compares a sensed inductor current to a peak inductor current value, and enables switching of the voltage regulator system according to the comparison.

In Aspect 2, the subject flatter of Aspect 1 optionally includes a comparison circuit configured to set the maximum peak inductor current value to a difference between the slope compensation current and a maximum peak inductor current command value that varies with the different values of output voltage.

In Aspect 3, the subject matter of one or both of Aspects 1 and 2 optionally includes a dynamic clamp circuit configured to modify a base clamp voltage using a multiplier determined using the input voltage and the output voltage, and convert the modified the base clamp voltage to the maximum peak inductor current command value.

In Aspect 4, the subject matter of Aspect 3 optionally includes a dynamic clamp circuit configured to convert the input voltage and the output voltage to an input current and an output current, generate the multiplier using a ratio including the input current and the output current, generate the multiplier using a ratio including the input current and the output current, and convert the maximum clamp voltage to the maximum peak inductor current command value.

In Aspect 5, the subject matter of one or any combination of Aspects 1-4 optionally includes an oscillator circuit configured to determine the slope compensation current using the output voltage and a switching cycle.

In Aspect 6, the subject matter of Aspect 5 optionally includes an oscillator circuit including a first converter circuit configured to produce an output current from the output voltage, a multiplier circuit configured to generate a charge current using the output current, a capacitor coupled to the multiplier circuit to generate a slope compensation voltage using the charge current, and a second converter circuit configured to convert the slope compensation voltage to the slope compensation circuit.

In Aspect 7, the subject matter of one or any combination of Aspects 1-6 optionally includes switching circuit configured to adjust a switching duty cycle to produce a regulated output voltage less than the input voltage.

In Aspect 8, the subject matter of one or nay combination of Aspects 1-7 optionally includes a switching circuit configured to adjust timing of a charge portion and a discharge portion of the switching duty cycle using the comparison of the sensed inductor current and a peak inductor current value.

Aspect 9 can include subject matter (such as a method of operating a voltage regulator circuit) or can optionally be combined with one or any combination of Aspects 1-8 to include such subject matter, comprising receiving energy at the voltage regulator circuit and generating an output voltage according to a switching cycle, determining a maximum peak inductor current command value using the output voltage and an input voltage of the voltage regulator circuit, setting a maximum peak inductor current value of the voltage regulator circuit using the maximum peak inductor current command value and a slope compensation current, wherein the maximum peak inductor current value is constant for different values of output voltage, comparing a sensed inductor current to a peak inductor current value, and enabling switching of the voltage regulator circuit according to the comparison.

In Aspect 10, the subject matter of Aspect 9 optionally includes subtracting the slope compensation current from a maximum peak inductor current command value that varies with the different values of output voltage to determine the maximum peak inductor current value that is constant for the different values of output voltage.

In Aspect 11, the subject matter of one or both of Aspects 9 and 10 optionally includes generating an output voltage less than an input voltage, modifying a base clamp voltage value using a multiplier determined using the input voltage and the output voltage, and converting the modified base clamp voltage value to the maximum peak inductor current command value.

In Aspect 12, the subject matter of one or any combination of Aspects 9-11 optionally includes determining the slope compensation current using the output voltage and the switching cycle.

In Aspect 13, the subject matter of Aspect 12 optionally includes generating a charge current using an output current of the voltage regulator system, charging a capacitor to generate a slope compensation voltage, and converting the slope compensation voltage to the slope compensation current.

In Aspect 14, the subject matter of one or any combination of Aspects 9-13 optionally includes generating an output voltage greater than an input voltage, modifying a base clamp voltage value using a multiplier determined using an output current of the voltage regulator system and a difference between the input voltage and the output voltage, and converting the modified base clamp voltage value to the maximum peak inductor current command value.

In Aspect 15, the subject matter of one or any combination of Aspects 9-14 optionally includes determining the slope compensation current using the output voltage, the input voltage, and the switching cycle.

In Aspect 16, the subject matter of Aspect 15 optionally includes generating a charge current using the difference between the input voltage and the output voltage, a reference current, and an oscillator current, charging a capacitor to generate a slope compensation voltage, and converting the slope compensation voltage to the slope compensation current.

Aspect 17 includes subject matter (such as a voltage regulator circuit) or can optionally be combined with one or any combination of Examples 1-16 to include such subject matter, comprising a switching circuit, a dynamic clamp circuit, and a comparison circuit. The dynamic clamp circuit determines a multiplier using an output current of the voltage regulator circuit and a difference between the input voltage and an output voltage, and modifies a base clamp voltage value using the multiplier to set a maximum peak inductor current command value.

In Aspect 18, the subject matter of Example 17 optionally includes a dynamic clamp circuit configured to convert the voltage difference between the input voltage and the output voltage to a difference current, generate the multiplier using the difference current, set a maximum peak clamp voltage using the base clamp voltage and the generated multiplier, and convert the maximum clamp voltage to the maximum peak inductor current command value.

In Aspect 19, the subject matter of one or both of Examples 17 and 18 optionally includes an oscillator circuit configured to determine the slope compensation current using the output voltage, the input voltage, and a switching cycle.

In Aspect 20, the subject matter of Aspect 19 optionally includes a first converter circuit configured to produce a difference current from a voltage difference between the output voltage and the input voltage, a multiplier circuit configured to generate a charge current using the difference current, a capacitor coupled to the multiplier circuit to generate a slope compensation voltage using the charge current, and a second converter circuit configured to convert the slope compensation voltage to the slope compensation circuit.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A voltage regulator circuit comprising:
    a switching circuit configured to adjust a switching duty cycle to produce a regulated output voltage from an input voltage using an error signal representative of a difference between a target voltage value and the output voltage;
    a dynamic clamp circuit configured to:
        convert the input voltage and the output voltage to an input current and an output current;
        generate a multiplier using a ratio including the input current and the output current;
        produce a maximum clamp voltage using a base clamp voltage and the generated multiplier; and
        convert the maximum clamp voltage to a maximum peak inductor current command value; and
    a comparison circuit configured to:
        set a maximum peak inductor current value equal to a difference between the maximum peak inductor current command value and a slope compensation current, wherein the maximum peak inductor current value is constant for different values of output voltage, and the maximum peak inductor current command value varies with the different values of output voltage;
        compare a sensed inductor current to a peak inductor current value; and
        enable switching of the voltage regulator system according to the comparison.

2. The voltage regulator circuit of claim 1, including an oscillator circuit configured to determine the slope compensation current using the output voltage and a switching cycle.

3. The voltage regulator circuit of claim 2, wherein the oscillator circuit includes:
    a first converter circuit configured to produce an output current from the output voltage;
    a multiplier circuit configured to generate a charge current using the output current;
    a capacitor coupled to the multiplier circuit to generate a slope compensation voltage using the charge current; and
    a second converter circuit configured to convert the slope compensation voltage to the slope compensation current.

4. The voltage regulator circuit of claim 1, wherein the switching circuit is configured to adjust the switching duty cycle to produce a regulated output voltage less than the input voltage.

5. The voltage regulator circuit of claim 1, wherein the switching circuit is configured to adjust timing of a charge portion and a discharge portion of the switching duty cycle using the comparison of the sensed inductor current and the peak inductor current value.

6. A method of operating a voltage regulator circuit, the method comprising:
    receiving energy at the voltage regulator circuit and generating an output voltage according to a switching cycle;
    converting an input voltage and the output voltage to an input current and an output current;
    determining a multiplier using a ratio including the input current and the output current;

generating a modified base clamp voltage value using a base clamp voltage value and the multiplier;

converting the modified base clamp voltage value to a maximum peak inductor current command value;

setting a maximum peak inductor current value of the voltage regulator circuit equal to a difference between the maximum peak inductor current command value and a slope compensation current, wherein the maximum peak inductor current value is constant for different values of output voltage and the maximum peak inductor current command value varies with the different values of output voltage;

comparing a sensed inductor current to a peak inductor current value, and enabling switching of the voltage regulator circuit according to the comparison.

7. The method of claim 6, wherein generating an output voltage according to a switching cycle includes generating an output voltage less than an input voltage.

8. The method of claim 7, including determining the slope compensation current using the output voltage and the switching cycle.

9. The method of claim 8, wherein determining the slope compensation current includes:

generating a charge current using an output current of the voltage regulator system;

charging a capacitor to generate a slope compensation voltage; and converting the slope compensation voltage to the slope compensation current.

10. The method of claim 6, wherein generating an output voltage according to a switching cycle includes generating an output voltage greater than an input voltage; and wherein determining the multiplier includes:

determining the multiplier using an output current of the voltage regulator system and a difference between the input voltage and the output voltage.

11. The method of claim 10, including determining the slope compensation current using the output voltage, the input voltage, and the switching cycle.

12. The method of claim 11, wherein determining the slope compensation current includes:

generating a charge current using the difference between the input voltage and the output voltage, a reference current, and an oscillator current;

charging a capacitor to generate a slope compensation voltage; and converting the slope compensation voltage to the slope compensation current.

13. A voltage regulator circuit comprising:

a switching circuit configured to adjust a switching duty cycle to produce a regulated output voltage greater than an input voltage using an error signal representative of a difference between a target voltage value and the output voltage;

a dynamic clamp circuit configured to:

determine a multiplier using an output current of the voltage regulator circuit and a difference between the input voltage and an output voltage; and modify a base clamp voltage value using the multiplier to set a maximum peak inductor current command value;

an oscillator circuit including:

a first converter circuit configured to produce a difference current from a voltage difference between the output voltage and the input voltage;

a multiplier circuit configured to generate a charge current using the difference current;

a capacitor coupled to the multiplier circuit to generate a slope compensation voltage using the charge current; and a second converter circuit configured to convert the slope compensation voltage to the slope compensation current; and a comparison circuit configured to:

set a maximum peak inductor current value equal to a difference between the maximum peak inductor current command value and a slope compensation current, wherein the maximum peak inductor current value is constant for different values of output voltage and the maximum peak inductor current command value varies with the different values of output voltage;

compare a sensed inductor current to a peak inductor current value;

compare a sensed inductor current to a peak inductor current value; and enable switching of the voltage regulator circuit according to the comparison.

14. The voltage regulator circuit of claim 13, wherein the dynamic clamp circuit is configured to:

convert the voltage difference between the input voltage and the output voltage to a difference current;

generate the multiplier using the difference current;

set a maximum peak clamp voltage using the base clamp voltage and the generated multiplier; and convert the maximum peak clamp voltage to the maximum peak inductor current command value.

\* \* \* \* \*